US011932830B2

(12) United States Patent
Gelderman et al.

(10) Patent No.: US 11,932,830 B2
(45) Date of Patent: Mar. 19, 2024

(54) SOLID CONTROLLED RELEASE CAUSTIC DETERGENT COMPOSITIONS

(71) Applicant: ECOLAB USA INC., Saint Paul, MN (US)

(72) Inventors: Max Gelderman, Saint Paul, MN (US); John Mansergh, Saint Paul, MN (US); Monique Roerdink Lander, Saint Paul, MN (US); Caitlyn Peltier, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 120 days.

(21) Appl. No.: 17/247,372

(22) Filed: Dec. 9, 2020

(65) Prior Publication Data

US 2021/0155873 A1 May 27, 2021

Related U.S. Application Data

(62) Division of application No. 15/964,658, filed on Apr. 27, 2018, now Pat. No. 10,889,783.

(60) Provisional application No. 62/585,825, filed on Nov. 14, 2017.

(51) Int. Cl.

| | |
|---|---|
| ***C11D 17/00*** | (2006.01) |
| ***C11D 1/66*** | (2006.01) |
| ***C11D 3/00*** | (2006.01) |
| ***C11D 3/04*** | (2006.01) |
| ***C11D 3/22*** | (2006.01) |
| ***C11D 7/06*** | (2006.01) |
| ***C11D 7/26*** | (2006.01) |

(52) U.S. Cl.

CPC ................ *C11D 3/044* (2013.01); *C11D 1/66* (2013.01); *C11D 3/0026* (2013.01); *C11D 3/222* (2013.01); *C11D 7/06* (2013.01); *C11D 7/268* (2013.01); *C11D 17/0065* (2013.01); *C11D 17/0091* (2013.01)

(58) Field of Classification Search

None

See application file for complete search history.

(56) References Cited

U.S. PATENT DOCUMENTS

| | | | |
|---|---|---|---|
| 3,048,548 | A | 8/1962 | Martin et al. |
| 3,334,147 | A | 8/1967 | Brunelle |
| 3,442,242 | A | 5/1969 | Laskey et al. |
| 3,929,678 | A | 12/1975 | Laughlin et al. |
| 4,233,171 | A | 11/1980 | McLaughlin et al. |
| 4,320,026 | A | 3/1982 | Cristobal et al. |
| 4,618,914 | A | 10/1986 | Sato et al. |
| 4,782,901 | A | 11/1988 | Phelps et al. |
| 4,830,773 | A | 5/1989 | Olson |
| 5,364,551 | A | 11/1994 | Lentsch et al. |
| 5,486,316 | A | 1/1996 | Bershas et al. |
| 5,612,305 | A | 3/1997 | Lewis |
| 5,854,189 | A | 12/1998 | Kruse et al. |
| 5,876,514 | A | 3/1999 | Rolando et al. |
| 5,981,456 | A | 11/1999 | Tartakovsky et al. |
| 5,990,066 | A | 11/1999 | Gordon et al. |
| 6,034,044 | A | 3/2000 | Scheper et al. |
| 6,239,091 | B1 | 5/2001 | Tartakovsky et al. |
| 6,462,007 | B1 | 10/2002 | Pieroni et al. |
| 6,486,117 | B1 | 11/2002 | Painter et al. |
| 6,548,472 | B1 | 4/2003 | Thoen et al. |
| RE38,262 | E | 10/2003 | Rolando et al. |
| 6,827,795 | B1 | 12/2004 | Kasturi et al. |
| 7,041,628 | B2 | 5/2006 | Sunder et al. |
| 7,537,705 | B2 | 5/2009 | Mizuno et al. |
| 8,541,357 | B2 | 9/2013 | Mukherjee et al. |
| 8,574,374 | B2 | 11/2013 | Hueffer et al. |
| 8,888,924 | B2 | 11/2014 | Silvernail et al. |
| 9,127,235 | B2 | 9/2015 | Silvernail et al. |
| 9,127,236 | B2 | 9/2015 | Silvernail et al. |
| 9,624,455 | B2 | 4/2017 | Labarre et al. |
| 9,796,947 | B2 | 10/2017 | Roerdink Lander et al. |
| 9,938,489 | B2 | 4/2018 | Tuerk et al. |
| 9,969,959 | B2 | 5/2018 | Roerdink et al. |
| 10,351,803 | B2 | 7/2019 | Martinez-Crowley et al. |
| 10,392,584 | B2 | 8/2019 | Roerdink Lander et al. |
| 10,501,708 | B2 | 12/2019 | Silvernail et al. |
| 10,851,331 | B2 * | 12/2020 | Gelderman ......... C11D 11/0035 |
| 2002/0035049 | A1 | 3/2002 | Suri et al. |
| 2002/0179124 | A1 | 12/2002 | Van Hauwermeiren et al. |
| 2003/0144172 | A1 | 7/2003 | Weuthen et al. |

(Continued)

FOREIGN PATENT DOCUMENTS

| | | | |
|---|---|---|---|
| CA | 2163757 | C | 12/1994 |
| CA | 2300643 | A | 5/2000 |

(Continued)

OTHER PUBLICATIONS

C. H. Bayley et al., "The Influence of Sodium Carboxymethyl Cellulose on the Suspending Power of Built Soap Solutions", Textile Research Journal, pp. 510-513. Jul. 1950.

Khan, Mohammad Yunus et al., "Interaction Between Aqueous Solutions of Polymer and Surfactant and its Effect on Physicochemical Properties", Asia-Pacific Journal of Chemical Engineering, vol. 3, pp. 579-585. 2008.

Linfield, W.M. et al., "Development of a Phosphate-Free Home Laundry Detergent", Journal of the American Oil Chemists' Society, vol. 49, pp. 254-258. Apr. 1972.

(Continued)

*Primary Examiner* — Lorna M Douyon

(74) *Attorney, Agent, or Firm* — McKee, Voorhees & Sease, PLC

(57) ABSTRACT

Solid detergent compositions for dishwashing or warewashing compositions and applications of use are disclosed. In particular, solid caustic-based compositions that do not require a traditional dispenser for controlled rate of release over multiple cycles are disclosed. Compositions, methods of employ and cleaning using the same are disclosed.

19 Claims, 6 Drawing Sheets

(56) References Cited

U.S. PATENT DOCUMENTS

| | | | |
|---|---|---|---|
| 2004/0005990 | A1 | 1/2004 | Aubay et al. |
| 2004/0072715 | A1 | 4/2004 | Griese et al. |
| 2004/0106534 | A1 | 6/2004 | Nitsch et al. |
| 2004/0167049 | A1 | 8/2004 | Kessler et al. |
| 2004/0254090 | A1 | 12/2004 | Lentsch et al. |
| 2004/0259748 | A1 | 12/2004 | Wiedemann et al. |
| 2005/0130868 | A1 | 6/2005 | Evans et al. |
| 2005/0153862 | A1 | 7/2005 | Lau et al. |
| 2006/0046951 | A1 | 3/2006 | Penninger et al. |
| 2006/0069004 | A1 | 3/2006 | Song et al. |
| 2006/0090779 | A1 | 5/2006 | Sharma et al. |
| 2006/0199750 | A1 | 9/2006 | Berger et al. |
| 2007/0017553 | A1 | 1/2007 | Neplenbroek et al. |
| 2007/0082836 | A1 | 4/2007 | Both et al. |
| 2007/0232517 | A1 | 10/2007 | Evans et al. |
| 2007/0244025 | A1 | 10/2007 | Timmann et al. |
| 2008/0280806 | A1 | 11/2008 | Bartelme et al. |
| 2008/0293615 | A1 | 11/2008 | Kieffer et al. |
| 2009/0165821 | A1 | 7/2009 | Gentschev et al. |
| 2009/0192064 | A1 | 7/2009 | Geret et al. |
| 2010/0065090 | A1 | 3/2010 | Tropsch |
| 2010/0081598 | A1 | 4/2010 | Sharma et al. |
| 2010/0139705 | A1 | 6/2010 | Oberlander |
| 2010/0154831 | A1 | 6/2010 | Neplenbroek et al. |
| 2010/0160204 | A1 | 6/2010 | Zipfel et al. |
| 2010/0222247 | A1 | 9/2010 | Zipfel et al. |
| 2010/0311633 | A1 | 12/2010 | Johnson et al. |
| 2011/0073802 | A1 | 3/2011 | Haag et al. |
| 2011/0180112 | A1 | 7/2011 | Silvernail et al. |
| 2011/0232691 | A1 | 9/2011 | Neplenbroek et al. |
| 2011/0232692 | A1 | 9/2011 | Zipfel et al. |
| 2012/0053110 | A1 | 3/2012 | Kiesel et al. |
| 2012/0097193 | A1 | 4/2012 | Rossetto et al. |
| 2012/0142576 | A1 | 6/2012 | Bartelme et al. |
| 2012/0149628 | A1 | 6/2012 | Tjelta et al. |
| 2012/0167922 | A1 | 7/2012 | Sendor-Muller et al. |
| 2012/0190607 | A1 | 7/2012 | Olson et al. |
| 2012/0225943 | A1 | 9/2012 | Gohl et al. |
| 2012/0231990 | A1 | 9/2012 | Besse et al. |
| 2012/0240961 | A1 | 9/2012 | Denome et al. |
| 2012/0291815 | A1 | 11/2012 | Monsrud et al. |
| 2012/0318303 | A1 | 12/2012 | Miralles et al. |
| 2012/0329700 | A1 | 12/2012 | Silvernail et al. |
| 2013/0035277 | A1 | 2/2013 | Silvernail et al. |
| 2013/0074875 | A1 | 3/2013 | Neplenbroek et al. |
| 2013/0130964 | A1 | 5/2013 | Besse et al. |
| 2013/0243661 | A1 | 9/2013 | Baratta et al. |
| 2013/0284210 | A1 | 10/2013 | Hueffer et al. |
| 2013/0310298 | A1 | 11/2013 | Labarre et al. |
| 2014/0031273 | A1 | 1/2014 | Walters et al. |
| 2014/0053876 | A1 | 2/2014 | Silvernail et al. |
| 2014/0135247 | A1 | 5/2014 | Graf et al. |
| 2014/0378365 | A1 | 12/2014 | Oberlander |
| 2015/0096130 | A1 | 4/2015 | Bullock et al. |
| 2015/0105314 | A1 | 4/2015 | Walters et al. |
| 2015/0119311 | A1 | 4/2015 | Catlin et al. |
| 2015/0152369 | A1 | 6/2015 | Ronco et al. |
| 2015/0166935 | A1 | 6/2015 | Gardner, Jr. et al. |
| 2015/0252295 | A1 | 9/2015 | Roerdink Lander et al. |
| 2015/0252296 | A1 | 9/2015 | Roerdink et al. |
| 2016/0289605 | A1 | 10/2016 | Dotzauer et al. |
| 2017/0355929 | A1 | 12/2017 | Letzelter et al. |
| 2018/0201876 | A1 | 7/2018 | Garcia Marcos et al. |
| 2018/0312787 | A1 | 11/2018 | Gelderman et al. |
| 2019/0316062 | A1 | 10/2019 | Garcia Marcos et al. |
| 2021/0040422 | A1 | 2/2021 | Gelderman et al. |
| 2021/0095227 | A1 | 4/2021 | Lundberg et al. |
| 2021/0155873 | A1 | 5/2021 | Gelderman et al. |
| 2021/0355413 | A1 | 11/2021 | Foster et al. |
| 2021/0395644 | A1 | 12/2021 | Olson et al. |
| 2022/0235295 | A1 | 7/2022 | Olson et al. |

FOREIGN PATENT DOCUMENTS

| | | | |
|---|---|---|---|
| CN | 101514315 | A | 8/2009 |
| CN | 103502416 | A | 1/2014 |
| DE | 19732689 | A | 2/1999 |
| DE | 20014919 | U1 | 11/2000 |
| EP | 0110731 | A2 | 6/1984 |
| EP | 0687720 | | 12/1995 |
| EP | 1103599 | A1 | 5/2001 |
| EP | 1491621 | A1 | 12/2004 |
| EP | 1550710 | A1 | 7/2005 |
| EP | 1882439 | A1 | 1/2008 |
| EP | 2392639 | A1 | 12/2011 |
| EP | 2754708 | A1 | 10/2013 |
| EP | 3502224 | A1 | 6/2019 |
| GB | 1444863 | A | 8/1976 |
| JP | 2001234195 | A | 8/2001 |
| JP | 2007131659 | A | 5/2007 |
| JP | 2007169473 | A | 7/2007 |
| JP | 2010528174 | A | 8/2010 |
| JP | 2012188586 | A | 10/2012 |
| JP | 2013517924 | A | 5/2013 |
| JP | 2013237792 | A | 11/2013 |
| JP | 2017020017 | A | 1/2017 |
| WO | 9947631 | A1 | 9/1999 |
| WO | 0020546 | A1 | 4/2000 |
| WO | 2008021971 | A1 | 2/2008 |
| WO | 2008147940 | A2 | 12/2008 |
| WO | 2011128672 | A2 | 10/2011 |
| WO | 2012098177 | A1 | 7/2012 |
| WO | 2012120442 | A2 | 9/2012 |
| WO | 2016038449 | A1 | 3/2016 |
| WO | 2016142565 | A1 | 9/2016 |
| WO | 2017013159 | A1 | 1/2017 |
| WO | 2017013161 | A1 | 1/2017 |

OTHER PUBLICATIONS

Wei-Li, Fan et al., "Study on Formulation and Process of Low-Density Concentrated Laundry Powder", vol. 29, (6), pp. 4-7. 2006.

Yoneyama, Yuji et al., "The Behaviour of Zeolite in a Detergent Solution", Tenside Detergents vol. 19, pp. 197-204. 1982.

European Patent Office, "The International Serach Report and Written Opinion of The International Searching Authority" in connection to PCT/US2018/029754 filed Apr. 27, 2018 dated Jun. 28, 2018.

Jandera et al., "Investigation of chromatographic behaviour of ethoxylated alcohol surfactants in normal-phase and reversed-phase systems using high-performance liquid chromatography-mass spectrometry," Journal of Chromatography A, Jul. 1998, vol. 813, No. 2, pp. 299-311.

Lovecarrie1, "No, you haven't! or have you . . . ? : Have your cake and EAT IT!" Excite Blog, Jan. 20, 2008, Retrieved from Internet: <URL: https://shoemad.exblog.jp/8034993>, 6 pages.

SafePack, Diversey, Nov. 2011, 2 pages.

Simplify Your Dishwashing, Diversey, Retrieved on Feb. 24, 2014, 2 pages.

Suma Combi Introduction Video, Diversey, Retrieved on Feb. 24, 2014, 3 pages.

Suma Revoflow, Diversey, Retrieved on Feb. 24, 2014, 2 pages.

* cited by examiner

| Top: Controlled Release | Bottom: Rapid Dissolution Phase | |
|---|---|---|
|  |  | Cycle 1-- A larger portion of the slow release side stays intact compared to the rapid dissolution half. |
|  | 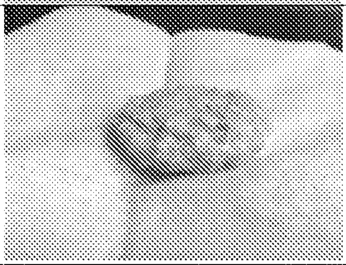 | Cycle 2-- The rapid dissolution portion of the solid is almost completely dissolved. |
|  | 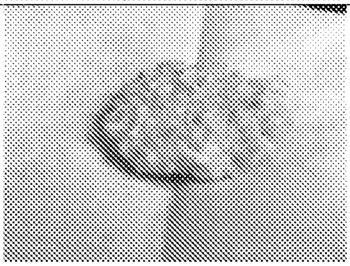 | Cycle 3-- The rapid dissolution portion of the solid is completely dissolved and only the portion containing polysaccharide remains. |
| 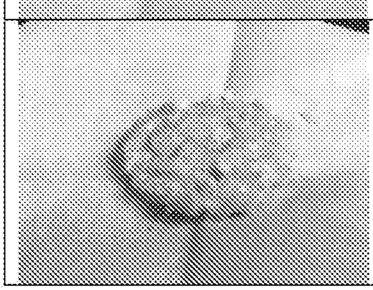 | | Cycle 4-- Only the portion with the polysaccharide remains but is continuing to shrink and dispense solid into the wash water. |

*FIG. 9*

SOLID CONTROLLED RELEASE CAUSTIC DETERGENT COMPOSITIONS

CROSS-REFERENCE TO RELATED APPLICATIONS

This is a divisional application of U.S. Ser. No. 15/964,658, filed Apr. 27, 2018, now U.S. Pat. No. 10,889,783, issued on Jan. 12, 2021, which claims priority under 35 U.S.C. § 119 to provisional application Ser. No. 62/585,825, filed Nov. 14, 2017, titled "Slow Releasing Caustic Based Detergent," both of which are herein incorporated by reference in their entirety.

FIELD OF THE INVENTION

The invention relates to solid detergent compositions for dishwashing or warewashing compositions and applications of use. In particular, the solid caustic-based compositions that do not require a traditional dispenser, such as those that dispense chemistry on a per cycle basis, or a dispenser that controls a detergency level in an application, for controlled rate of release over multiple cycles. In stead, the solid detergent compositions are formulated to provide slow releasing or controlled releasing of the detergent composition, which does not require a dispensing system to control the release of the composition. In some embodiments, the solid detergent compsoitions can be employed as a daily detergent composition.

BACKGROUND OF THE INVENTION

Conventional detergents used in the vehicle care, food and beverage, warewashing, and laundry industries include alkaline detergents. Alkaline detergents, particularly those intended for institutional and commercial use, can contain various active components to solubilize preexisting inorganic salts and/or soils in the particular application of use. Various methods of dispensing conventional detergents are known, including the use of various dispensing systems and controlled release formulations designed to provide solid detergent offerings that can last for an extended period of time while reducing the occurrence of replacing the detergent composition in a dispenser and/or employing a dispenser.

In many standard or conventional applications of use a method of cleaning wares includes washing wares in a wash tub of an institutional warewashing machine or a consumer dishwashing machine with at least one cycle that includes at least one wash cycle and at least one rinse cycle. Prior to or at the beginning of the cycle a detergent composition is dispensed from a dispenser of the warewashing or dishwashing machine. The detergents are typically added to an automated dispenser or delivery device of an institutional warewashing or consumer dishwashing machine prior to or at the start of a cycle. An automated dispenser is a device which controls a composition's availability for contact with water such that a composition is only available for contact with water during a specified period of the cycle.

There is a need in the art for an alternative, and preferably controlled release detergent composition that can be used in small footprint kitchens and/or other locations where traditional solid detergent dispensers are unavailable. Accordingly, it is an objective to develop a controlled release detergent composition, namely compositions and methods for a solid detergent offering in locations where traditional solid dispensers are unavailable. Other objects, advantages and features will become apparent from the following specification taken in conjunction with the accompanying drawings.

BRIEF SUMMARY OF THE INVENTION

An advantage of the compositions, methods and systems is that a solid controlled release alkaline detergent composition can be provided without requiring a dispenser. In embodiments, an automated dispenser or delivery device is not required to dispense a solid composition. It is an advantage of the compositions, methods and systems that homogenous solid compositions comprising a caustic alkalinity source and at least one polysaccharide material provide desired controlled release.

In an embodiment, compositions, cleaning systems and methods of use thereof are provided. While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

FIG. 9 shows images of both sides of a 2-phase tablet dispensed according to embodiments of the compositions, methods and systems.

Figure 1:
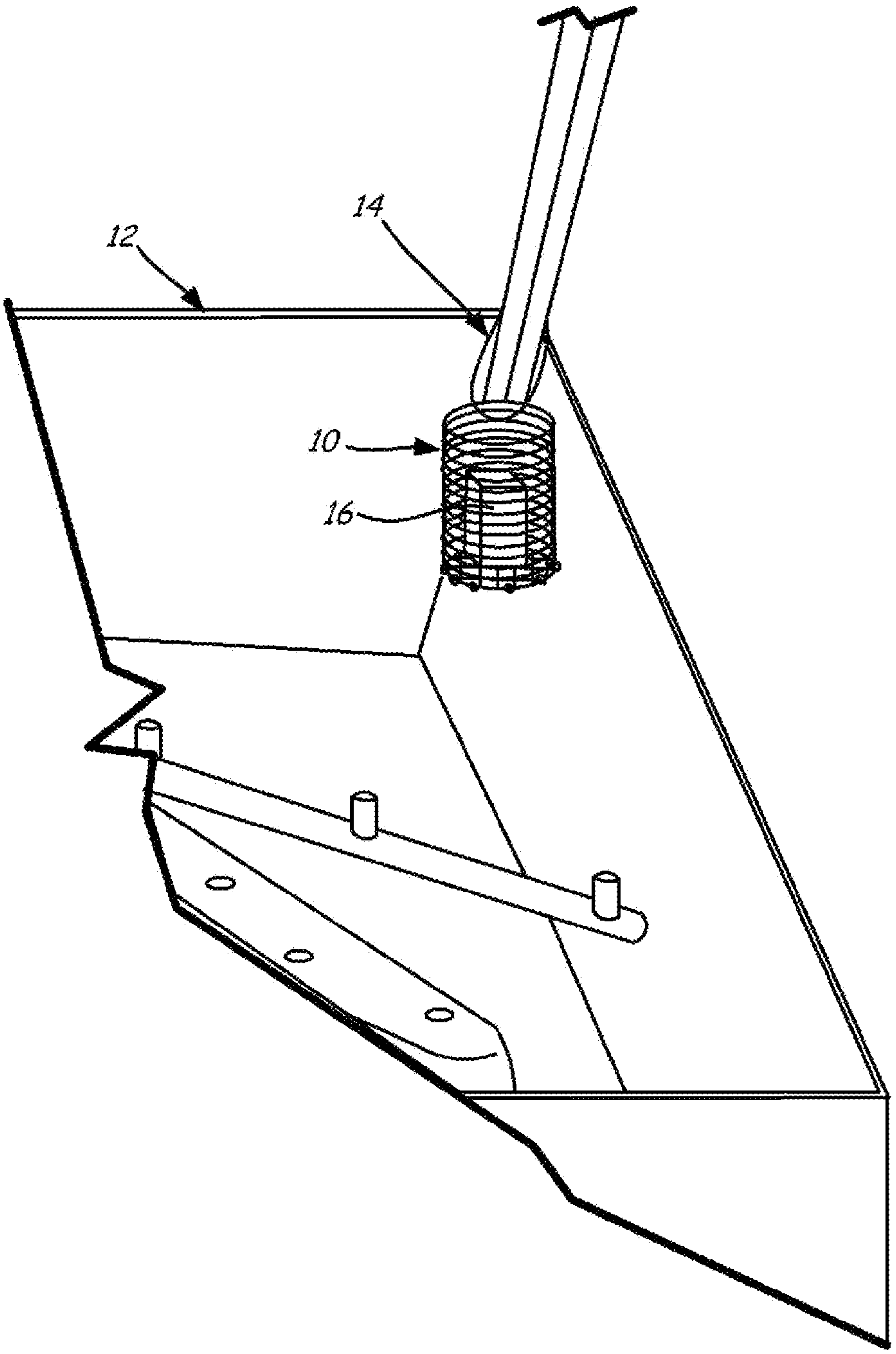
FIG. 1 shows a perspective view of an example holder for a solid controlled release tablet located inside an institutional warewashing machine.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments are not limited to particular solid compositions and dispensing thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep soil suspended in water instead of redepositing onto the object being cleaned. Antiredeposition agents are useful in the present compositions to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof.

Furthermore, unless otherwise specifically limited, the term "polymer" shall include all possible geometrical configurations of the molecule.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions include but not limited to those that include polypropylene polymers (PP), polycarbonate polymers (PC), melamine formaldehyde resins or melamine resin (melamine), acrylonitrile-butadiene-styrene polymers (ABS), and polysulfone polymers (PS). Other exemplary plastics that can be cleaned using the compounds and compositions include polyethylene terephthalate (PET) polystyrene and polyamide.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, and compositions may comprise, consist essentially of, or consist of the components and ingredients as well as other ingredients described herein. As used herein, "consisting essentially of" means that the methods, systems, and compositions may include additional steps, components or ingredients, but only if the additional steps, components or ingredients do not materially alter the basic and novel characteristics of the claimed methods, systems, and compositions. It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Solid Compositions

In an aspect the solid ware wash compositions according to the disclosure comprise, consist of, and/or consist essentially of a homogenous composition of an alkali metal hydroxide source, a polysaccharide material, at least one active ingredient (e.g. surfactants for cleaning and/or rinsing) and optionally additional functional ingredients.

In an aspect, the solid compositions do not include distinct or separate components thereof. The solid compositions are referred to as a single-part or a one-part system. This is beneficial and distinct from prior detergent compositions which are controlled release as a result of encapsulation, coating or membranes, separate dosing of components, such as in liquid formulations, or having distinct compartments for physical separation of components (sachets, pouches or the like) and must then be combined with a distinct detergent composition or other composition to provide the desired activity at the controlled release rate.

In some aspects, the solid compositions described herein can also include a multi-phase, such as a two-phase, or two or more solid phases, to increase the total concentration of the detergent composition delivered over a desired number of cycles. In such aspects, there are multiple homogenous layers of the solid composition, wherein at least one layer comprises the polysaccharide materials, hydroxide alkalinity source, and active ingredient cleaning agent. In another aspect, a first phase is a homogenous solid comprising the polysaccharide materials, hydroxide alkalinity source, and active ingredient cleaning agent, and the second phase is also a homogenous solid comprising the hydroxide alkalinity source and active ingredient cleaning agent. In each aspect, the first phase and/or second phase can further include the various additional functional ingredients. In an aspect, the ratio of the first phase to the second phase on weight basis is from about 10:1 to about 1:10, from about 5:1 to about 1:5, from about 2:1 to about 1:2, or about 1:1 and is modified to deliver a desired concentration of cleaning agents. Such two-phase solids are distinct from multi-compartment solids and/or liquids (e.g. soluble packets or envelops or other encapsulated forms) or compressed and non-compressed formulations, as each of the two phases are homogenous solids with one phase containing the controlled (or also referred to as slow) release agents (the polysaccharide material) and the other phase not containing the controlled release agents (the polysaccharide material).

In an aspect of the embodiments, the solid compositions are designed to release a certain portion or amount of the solid composition in each cycle. In an exemplary embodiment, a warewashing cycle releases about 0.5 grams of the solid composition per cycle, about 1 gram of the solid composition per cycle, about 2 grams of the solid composition per cycle, about 5 grams of the solid composition per cycle, about 6 grams of the solid composition per cycle, or about 10 grams of the solid composition per cycle (including all ranges therebetween). Accordingly, a skilled artisan will ascertain from the disclosure that the size of the solid composition can be suited for the number of cycles run on a daily basis (or other increment of time).

In an aspect, the solid compositions provide at least 5 cycles, at least 6 cycles, at least 7 cycles, at least 8 cycles, at least 9 cycles, at least 10 cycles, at least 15 cycles, at least 20 cycles, at least 25 cycles, at least 30 cycles, at least 35 cycles, at least 40 cycles, or greater for a 50 gram tablet. As one skilled in the art will ascertain, the larger the solid composition is formulated (e.g. 100 grams, 250 grams, or larger) an increase in the number of cycles provided by the solid composition can be achieved and is included within the scope of the present compositions and methods.

In an aspect, the solid compositions provide at least 10 cycles, at least 11 cycles, at least 12 cycles, at least 13 cycles, at least 14 cycles, at least 15 cycles, at least 16 cycles, at least 17 cycles, at least 18 cycles, at least 19 cycles, at least 20 cycles, at least 25 cycles, at least 30 cycles, at least 35 cycles, at least 40 cycles, at least 50 cycles, at least 60 cycles, at least 70 cycles, at least 80 cycles, at least 90 cycles, at least 100 cycles, or greater for a 100 gram tablet.

Hydroxide Alkalinity Source

In an aspect the detergent compositions include an alkalinity source. In an aspect, the alkalinity source is selected from a hydroxide, also referred to as caustic, source, such as an alkali metal hydroxide. Suitable alkali metal hydroxides include, but are not limited to sodium hydroxide, potassium hydroxide or calcium oxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as, for example, a 45% and a 50% by weight solution.

The detergent compositions include an effective amount of the alkali metal hydroxide alkalinity source, wherein an effective amount of the alkalinity source should be considered as an amount that provides a use composition having a pH between about 10.5 and about 13, or preferably between about 10.5 and about 12.5.

In an aspect, the compositions include from about 20 wt-% to about 95 wt-% alkalinity source, from about 25 wt-% to about 90 wt-% alkalinity source, from about 45 wt-% to about 90 wt-% alkalinity source, from about 50 wt-% to about 90 wt-% alkalinity source, from about 55 wt-% to about 85 wt-% alkalinity source, from about 30 wt-% to about 75 wt-% alkalinity source, from about 40 wt-% to about 75 wt-% alkalinity source, and preferably from about 45 wt-% to about 75 wt-% alkalinity source. In addition, without being limited, all ranges recited are inclusive of the numbers defining the range and include each integer within the defined range.

Polysaccharide Materials

The solid ware wash compositions according to the disclosure include at least one polysaccharide material which has a desired measureable viscosity. In an aspect, the polysaccharide material can be a polysaccharide cellulosic material. In an aspect, the polysaccharide material can be a combination of more than one polysaccharide cellulosic material and a xanthangum. In another aspect, the polysaccharide material can be a xanthan gum. In yet another aspect, the polysaccharide material can be a combination of a polysaccharide cellulosic material (or more than one polysaccharide cellulosic material) and a xanthan gum.

Examples of suitable cellulosic materials include, but are not limited to carboxymethylcellulose (CMC), hydroxyethylcellulose (HEC), hydroxypropylcellulose (HPC), hydroxypropyl methylcelluslose (HPMC), methylcellulose (MC), cellulose sulfate esters, cellulose acetate, and cellulose triacetate. The cellulosic material can function as a solidification agent and as a controlled release agent. The cellulosic material also functions to regulate the amount of active ingredient that dissolves or diffuses into the water. The amount of active ingredient released is adjusted by modifying the components of the composition.

Additional suitable polysaccharide materials for use in the solid compositions include, but are not limited to natural gums, including for example xanthan gums (or xanthum gums).

Additional suitable polysaccharide materials for use in the solid compositions can include, but are not limited to polysaccharides containing 3 or more saccharide units. Suitable saccharides include, but are not limited to glucose, fructose, lactulose galactose, raffinose, trehalose, sucrose, maltose, turanose, cellobiose, raffinose, melezitose, maltriose, acarbose, stachyose, ribose, arabinose, xylose, lyxose, deoxyribose, psicose, sorbose, tagatose, allose, altrose, mannose, gulose, idose, talose, fucose, fuculose, rhamnose, sedohepulose, octuse, nonose, erythrose, theose, amylose, amylopectin, pectin, inulin, modified inulin, potato starch, modified potato starch, corn starch, modified corn starch, wheat starch, modified wheat starch, rice starch, modified rice starch, cellulose, modified cellulose, dextrin, dextran, maltodextrin, cyclodextrin, glycogen and oligiofructose, sodium carboxymethylcellulose, linear sulfonated .alpha.-(1,4)-linked D-glucose polymers, .gamma.-cyclodextrin, amylose, modified inulin, potato starch, modified potato starch, corn starch, modified corn starch, wheat starch, modified wheat starch, rice starch, and modified rice starch and the like.

One or more polysaccharide materials can be used in the solid compositions. In some aspects a polysaccharide cellulosic material may preferably be used with or in combination with a xanthan gum and/or other polysaccharide materials. Examples of suitable commercially available xanthans include, but are not limited to Ketrol®, Kelzan® AR, Kelzan® D35, Kelzan® S, Kelzan® XZ, available from CP Kelco division of Merck, San Diego, Calif. Known organic crosslinking agents can also be used.

In an embodiment, a combination of polysaccharide materials are used in the solid compositions. In an embodiment, at least two polysaccharide materials are used in the solid compositions.

In an embodiment, polysaccharide material(s) with a degree of polymerization between about 200 and about 15,000, or preferably between about 200 and about 3000 are used in the solid compositions. In an embodiment, polysaccharide material(s) with about a 1 wt-% aqueous solution viscosity (25 dC) between about 1 and about 5000 cps, or with a 2 wt-% aqueous solution viscosity (25 dC) between about 1 and about 5000 cps are used in the solid compositions. In an embodiment, polysaccharide material(s) having a degree of substitution (D.S.) between zero and about 3, or preferably between about 0.5 and about 1.5 are used in the solid compositions.

In a preferred embodiment, polysaccharide material(s) in the solid compositions slow down or delay the dissolution of (and reduce the solubility of) the hydroxide alkalinity in the detergent composition and include polysaccharide material(s) with (a) a degree of polymerization between about 200 and about 15,000, or preferably between about 200 and about 3000, (b) between about a 1 wt-% to about a 2 wt-% aqueous solution viscosity (25 dC) between about 1 and about 5000 cps, and/or (c) a degree of substitution (D.S.) between 0 and about 3, or preferably between about 0.5 and about 1.5.

As referred to herein, a D.S. for polysaccharide material(s) indicates the frequency of carboxymethyl-, methyl-, ethyl-, hydroxyethyl-, hydroxypropyl-, hydroxypropylmethyl-, acetate-, triacetate-, acetate-propionate-, acetate-butyrate, and the like groups attached to each individual glucose unit of a cellulose molecule. In a still further aspect, a D.S. for polysaccharide material(s) can also refer to the substitution of one or more of carboxymethyl-, methyl-, ethyl-, hydroxyethyl-, hydroxypropyl-, hydroxypropylmethyl-, acetate-, triacetate-, acetate-propionate-, acetate-butyrate, and/or the like groups attached to each individual glucose unit of a cellulose molecule. Unexpectedly, the use of the polysaccharide material(s) described herein for the solid compositions provide the desired slow-releasing characteristics through use of a relatively low polysaccharide material concentration, such as less than about 20% by weight of the solid composition.

Suitable concentrations for the polysaccharide material(s) in the solid ware wash composition can be between about 1% and about 20% by weight of the solid composition. Further suitable concentrations of polysaccharide material(s) in the solid compositions can be between about 1% and about 15% by weight of the solid composition. Still further suitable concentrations of polysaccharide material(s) in the solid compositions can be between about 5% and about 20% by weight of the solid composition, or between about 5% and about 15% by weight of the solid composition, or between about 10% and about 15% by weight of the solid composition, or between about 5% and about 10% by weight of the solid composition. A solid composition having too high of a polysaccharide material(s) content may prevent a suitable amount of active ingredient from being added to the composition while a composition having not enough polysaccharide material(s) will not provide the desired controlled release of the hydroxide solid composition.

Water

Water may be independently added to the solid composition or may be provided in the composition as a result of its presence in an aqueous material that is added to the solid detergent composition. For example, materials added to the solid composition may include water or may be prepared in an aqueous premix. Typically, water is introduced into the composition to provide a desired viscosity for processing prior to solidification and to provide a desired rate of solidification. The water may also be present as a processing aid and may be removed or become water of hydration. The water may be added separately as deionized water, softened water, or hard water.

The amount of water in the resulting solid composition will depend on whether the solid composition is processed through forming techniques (including solidification through pressing), casting (solidification occurring within a container) techniques, or other solidification methods. In general, when the components are processed by forming techniques, the solid controlled release composition may include a smaller amount of water for solidification compared with the casting techniques. Suitable concentrations of water include between about 0 wt-% and about 20 wt-% of the solid composition. Further suitable concentrations of water include between about 1 wt-% and about 20 wt-%, or between about 5 wt-% and about 20 wt-% of the solid composition.

Active Ingredient

The solid controlled release composition further includes at least one active ingredient. The "active ingredient" can include a material that when dispersed or dissolved in a use and/or concentrate solution, such as an aqueous solution, provides a beneficial property in a particular use. Examples of active ingredients include but are not limited to chelants, enzymes, surfactants, additional alkalinity sources, and the like.

The compositions can be provided in any of a variety of embodiments. In an embodiment, the detergent composition may be substantially-free and/or free of phosphorous, nitrilotriacetic acid (NTA) and ethylenediaminetetraacetic acid (EDTA). Phosphorus-free means a composition having less than approximately 0.5 wt %, more particularly, less than approximately 0.1 wt %, and even more particularly less than approximately 0.01 wt % phosphorous based on the total weight of the composition. NTA-free means a composition having less than approximately 0.5 wt %, less than approximately 0.1 wt %, and particularly less than approximately 0.01 wt % NTA based on the total weight of the composition. When the composition is NTA-free, it is also compatible with chlorine, which functions as an anti-redeposition and stain-removal agent. When diluted to a use solution, the detergent composition includes phosphorous-containing components, NTA and EDTA concentrations of less than approximately 100 ppm, particularly less than approximately 10 ppm, and more particularly less than approximately 1 ppm.

Surfactants

In an aspect, the detergent compositions may optionally include a defoaming agent. In a preferred aspect, the defoaming agent is a nonionic surfactant. In a preferred aspect, the defoaming agent is a nonionic alkoxylated surfactant. Exemplary suitable alkoxylated surfactants include ethylene oxide/propylene block copolymers (EO/PO copolymers), such as those available under the name Pluronic, capped EO/PO copolymers, alcohol alkoxylates, capped alcohol alkoxylates, mixtures thereof, or the like.

Other defoaming agents can include silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. nonionic surfactant useful in the composition is a low-foaming nonionic surfactant. Examples of nonionic low foaming surfactants useful in the compositions include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

Compounds with the following structure:

$$RO—(PO)_{0\text{-}5}(EO)_{1\text{-}30}(PO)_{1\text{-}30}$$

Wherein R is a C8-18 linear or branched alkyl group; EO=ethylene oxide; PO=propylene oxide Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Alkoxylated diamines produced by the sequential addition of propylene oxide and ethylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic Surfactants.

Alkoxylated diamines produced by the sequential addition of ethylene oxide and propylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic R™ Surfactants.

Compounds which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Polyoxyalkylene surface-active agents which are advantageously used in the compositions correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

Alkoxylated amines or, most particularly, alcohol alkoxylated/aminated/alkoxylated surfactants. These non-ionic surfactants may be at least in part represented by the general formulae:

$$R^{20}—(PO)_sN\text{-}(EO)_tH,$$

$$R^{20}—(PO)_sN\text{-}(EO)_tH(EO)_tH, \text{ and}$$

$$R^{20}—N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}—(PO)_v—N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic PEA 25 Amine Alkoxylate.

Suitable amounts of the nonfoaming nonionic surfactant include between about 0.01% and about 15% by weight of the cleaning solution. Particularly suitable amounts include between about 0.1% and about 12% or between about 0.5% and about 10% by weight of the cleaning solution.

Additional Functional Ingredients

The components of the detergent composition can further be combined with various functional components suitable for use in ware wash applications. In some embodiments few or no additional functional ingredients are disposed therein. In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

In some embodiments, the compositions may include enzymes, defoaming agents, anti-redeposition agents, anti-scale agents, bleaching agents, solubility modifiers, dispersants, metal protecting agents, stabilizing agents, corrosion inhibitors, sequestrants and/or chelating agents, threshold inhibitors, crystal modifiers, fragrances and/or dyes, rheology modifiers or thickeners, hydrotropes or couplers, buffers, solvents and the like. The compositions may include from about 0 wt-% to about 50 wt-%, from about 0.01 wt-% to about 50 wt-%, from about 0.1 wt-% to about 50 wt-%, from about 1 wt-% to about 50 wt-%, from about 1 wt-% to about 40 wt-%, from about 1 wt-% to about 30 wt-%, from about 1 wt-% to about 25 wt-%, from about 5 wt-% to about 25 wt-%, or t from about 5 wt-% to about 20 wt-% additional functional ingredients.

The composition can include one or more building agents, also called chelating or sequestering agents (e.g., builders), including, but not limited to: condensed phosphates, alkali metal carbonates, phosphonates, aminocarboxylic acids, and/or polycarboxylic acids. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight Additional ranges of the builders include between approximately 3% to approximately 20% by weight, between approximately 6% to approximately 15% by weight, between approximately 25% to approximately 50% by weight, and between approximately 35% to approximately 45% by weight.

Examples of suitable anti-scale agents, threshold inhibitors, and dispersants include aminocarboxylates. Suitable aminocarboxylates include, for example, N-hydroxyethylaminodiacetic acid, ethylenediaminetetraacetic acid (EDTA), methylglycinediacetic acid (MGDA), hydroxyethylenediaminetetraacetic acid, diethylenetriaminepentaacetic acid, N-hydroxyethyl-ethylenediaminetriacetic acid (HEDTA), glutamic acid N,N-diacetic acid (GLDA), diethylenetriaminepentaacetic acid (DTPA), and other similar acids having an amino group with a carboxylic acid substituent. Beneficially, the aminocarboxylates provide a strong cleaning performance while employing chelants that are substantially free of NTA-containing compounds, making the detergent composition more environmentally acceptable. Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the detergent composition is free of aminocarboxylates.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the detergent composition by fixing the free water present in the detergent composition as water of hydration. In some embodiments, the compositions include a phosphonate. Examples of phosphonates include, but are not limited to: phosphinosuccinic acid oligomer (PSO) described in U.S. Pat. Nos. 8,871,699 and 9,255,242; 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri (methylenephosphonate), sodium salt, (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta (methylenephosphonate), sodium salt (DTPMP), $C_9H_{(28-x)}N_3Na_xO_{15}P_5$ (x=7); hexamethylenediamine (tetramethylenephosphonate), potassium salt, $C_{10}H_{(28-x)}N_2K_xO_{12}P_4$ (x=6); bis(hexamethylene)triamine (pentamethylenephosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the composition is phosphorous-free. Suitable amounts of the phosphonates include between about 0% and about 25% by weight of the composition, between about 0.1% and about 20%, or between about 0.5% and about 15% by weight of the composition.

Additional water conditioning polymers can also be referred to as non-phosphorus containing builders. Additional water conditioning polymers may include, but are not limited to: polycarboxylates. Exemplary polycarboxylates that can be used as builders and/or water conditioning polymers include, but are not limited to: those having pendant carboxylate (—CO2-) groups such as polyacrylic acid homopolymers, polymaleic acid homopolymers, maleic/olefin copolymers, sulfonated copolymers or terpolymers, acrylic/maleic copolymers or terpolymers polymethacrylic acid homopolymers, polymethacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers.

Enzymes

The solid compositions can further include an enzyme to provide enhanced removal of soils, prevention of redeposition and additionally the reduction of foam in use solutions of the cleaning compositions. The purpose of the enzyme is to break down adherent soils, such as starch or proteinaceous materials, typically found in soiled surfaces and removed by a detergent composition into a wash water source. The enzyme compositions remove soils from substrates and prevent redeposition of soils on substrate surfaces. Enzymes provide additional cleaning and detergency benefits, such as anti-foaming.

Exemplary types of enzymes which can be incorporated into detergent compositions or detergent use solutions include amylase, protease, lipase, cellulase, cutinase, gluconase, peroxidase and/or mixtures thereof. An enzyme composition may employ more than one enzyme, from any suitable origin, such as vegetable, animal, bacterial, fungal or yeast origin. However, according to a preferred embodiment, the enzyme is a protease. As used herein, the terms "protease" or "proteinase" refer to enzymes that catalyze the hydrolysis of peptide bonds.

As one skilled in the art shall ascertain, enzymes are designed to work with specific types of soils. For example, according to an embodiment, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Examples of commercially-available protease enzymes are available under the following trade names: Esperase, Purafect, Purafect L, Purafect Ox, Everlase, Liquanase, Savinase, Prime L, Prosperase and Blap.

Additional description of enzyme compositions suitable for use is disclosed for example in U.S. Pat. Nos. 7,670,549, 7,723,281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

In a preferred aspect, the enzyme compositions are provided in a solid composition in an amount between about 0.01 wt-% to about 40 wt-%, between about 0.01 wt-% to about 30 wt-%, between about 0.01 wt-% to about 10 wt-%, between about 0.1 wt-% to about 5 wt-%, and preferably between about 0.2 wt-% to about 1 wt-%.

EMBODIMENTS

Exemplary ranges of the solid ware wash compositions are shown in Table 1 in weight percentage of the solid detergent compositions.

TABLE 1

| Material | First Exemplary Range wt-% | Second Exemplary Range wt-% | Third Exemplary Range wt-% | Fourth Exemplary Range wt-% |
|---|---|---|---|---|
| Hydroxide Alkalinity Source | 20-95 | 45-90 | 50-90 | 55-85 |
| Polysaccharide material | 0.01-40 | 0.1-30 | 1-30 | 1-20 |
| Additional polysaccharides | 0-10 | 0.1-10 | 0.1-7.5 | 1-5 |
| Active Ingredient (e.g. surfactant) | 0.1-40 | 0.5-40 | 1-30 | 1-10 |
| Additional Functional Ingredients | 0-50 | 0.1-50 | 1-40 | 1-25 |

The solid ware wash compositions can be provided in various product forms. Any suitable product form can be used as described herein. Suitable product forms include, but are not limited to: capsules, tablets, coated tablets, pucks, brick, block, and combinations thereof. In a preferred aspect, the solid controlled release composition is a substantially homogenous composition and can be in block, tablet or capsule form.

The solid ware wash compositions can be provided in various product sizes, including, for example a solid having a mass of at least about 25 grams, at least about 50 grams, at least about 100 grams, at least about 250 grams, at least about 500 grams, at least about 1000 grams, or greater. It should be understood that the concentration of the active components in the solid ware wash composition will vary depending on the dilution rate of the concentrate solid ware wash composition. Beneficially, the solid detergent compositions are dispensed directly into the use solution to create a concentrated use solution.

In an aspect, the detergent composition preferably provides efficacious cleaning by diluting the solid concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

Cleaning Systems

In an aspect, a cleaning system comprising the solid controlled release composition and a holder (such as shown in FIG. 1), wherein the holder configured to hold the solid composition and configured to be secured to a wash tub of a warewashing or dishwashing machine. The holder can comprise a mesh, basket, cage, net cartridge or case. Beneficially, the solid controlled release composition does not require a conventional dispenser. As depicted in FIG. 1 an examplary holder 10 is located in wash tub 12 of a warewashing machine. Portions of wash tub 12 have been broken away. Hanger 14 secures holder 10 to a support of the warewashing machine. Solid controlled release tablet 16 is placed within holder 10. Holder 10 can have any suitable shape which supports solid controlled release tablet 16. For example, holder 10 can have a bottom and sides and an open top. Holder 10 is configured to allow water to enter and exit. For example, holder 10 may be formed from a mesh in which voids allow water to enter and exit the holder. In use, water enters holder 10 and contacts solid controlled release tablet 16 which releases a portion of the active ingredient into the water to form a use solution. The use solution leaves holder 10 and contacts wares in the wash tub. Holder 10 is strong enough to support controlled release tablet 16 while allowing a sufficient amount of water to contact solid controlled release tablet 16.

The holder can be removably or non-removably attached to the solid controlled release composition. In one example, the holder is a cage, basket, net, cartridge or case which supports the solid controlled release composition while allowing water to contact a large portion of the composition. In another example, adhesive can attach the holder to the solid controlled release composition. In a further example, controlled release composition is molded around the holder. The holder can have perforations, holes or voids to enable water to contact a large portion of the composition and to enable the use solution to dispense from the holder. The holder supports the solid controlled release composition inside the warewashing machine. For example, adhesive may attach the holder to the inside of the warewashing machine. Additionally or alternatively, the holder may attach to the inside of the wash tub by clips, hooks, suction cups, strings, ropes or other fastening devices. Structures within the warewashing machine may also be used to support the holder. For example, the solid controlled release composition may be directly fastened to the machine housing or a structure within the machine design. Furthermore, the solid controlled release composition may be directly or indirectly held or fastened to removable parts associated with the warewashing or dishwashing machine, including but not limited to inserts, racks, baskets, dishware, plasticware, utensils and the like.

Beneficially, the solid controlled release composition does not require an automated dispenser or delivery device to control the dispensing of the composition. For use, the current solid controlled release composition can be placed in the wash tub before the beginning of the cycle and may be available for contact with water throughout an entire cycle. The solid controlled release composition may be present in the wash tub throughout a complete cycle, and is formulated to be present in the wash tub for more than one cycle, more than two cycles, and preferably for a days' worth of cycles. The current controlled release composition is formulated so that the active cleaning ingredients in the solid controlled release composition dissolve and disperse when contacted with water, such that the solid controlled release composition does not require an automated dispenser or delivery device to control the dispensing of the active ingredient(s).

When the solid controlled release composition is mixed with water the solid controlled release composition forms an aqueous mixture of the active ingredient(s) of the solid controlled release composition. Beneficially, the active ingredients can provide a two-in-one detergent and rinse aid composition.

Methods of Use and Dispensing

The solid controlled release composition may be suitable for both industrial and consumer applications including, but not limited to institutional warewashing, consumer dishwashing, laundering, and food and beverage applications, hard surface cleaning, clean in place (CIP) systems, vehicle care, healthcare. Methods of using the solid controlled release compositions are also provided. For ease of description, the solid controlled release composition will be described with use in an institutional warewashing machine. However, one skilled in the art will recognize that the composition may also be used in a consumer dishwashing machine.

Beneficially, an automated dispenser or delivery system is not required to dispense the solid controlled release composition during a specified stage of a cycle, such as during the wash cycle. That is, no system or mechanism controls when the solid controlled release composition is added to the cycle. Instead, the solid controlled release composition can be placed directly inside the wash tub of a warewashing machine at the start of the cycle (e.g., before the fill and/or wash cycle) and may be present throughout the cycle. The solid controlled release composition can be available for contact with water through the entire cycle. When contacted with water, the solid controlled release composition will partially dissolve or erode and the contents of the solid controlled release composition will mix with the water to form an aqueous mixture or solution. For example, the solid control release composition will partially dissolve or erode when contacted with water from the wash cycle or rinse cycle. Water from a source other than water from the wash or rinse cycle may also be applied to the solid control release composition to partially dissolve or erode the composition or combinations of water sources may be used. The controlled release solid may be placed above or below the water line in the wash tub. Preferably, the controlled release solid composition is placed above the water line in the wash tub.

A use solution is obtained by contacting the solid composition with a water source. The pH of the use solution is maintained in the alkaline range through continuous controlled release of the solid component in order to provide sufficient detergency properties. In one example, the pH of the use solution is between about 10 and about 13. Particularly, the pH of the use solution is between about 10.5 and about 13, or between about 10.5 and about 12.5. If the pH of the use solution is too high, for example, above 13, the use solution may be too alkaline and attack or damage the surface to be cleaned.

The solid controlled release composition can release the active ingredients over multiple wash cycles. In one example, the solid controlled release composition is formulated to release the active ingredient over a period of two or more wash cycles, and preferably over a period of at least 20 wash cycles, at least 25 wash cycles, or greater. The rate at which the active ingredient is dispersed can be modified by adjusting the composition of the solid controlled release composition, increasing or decreasing the size of the solid controlled release composition, changing the amount of surface area exposed to water, positioning the controlled solid release composition in different spaces inside the wash tub, or adjusting the cycle settings, such as but not limited to the water temperature and cycle duration. For example, increasing the weight percentage of polysaccharide material (or combination of polysaccharide materials) may decrease the rate at which the active ingredient is dispersed, increasing the number of wash cycles the solid controlled release composition may be used before requiring replacement.

Methods of Manufacture

In general the solid controlled release composition can be created by combining the components according to various solid formation methods to provide the homogenous solid. In one example, each of the components are mixed and are pressed into a solid form. In exemplary methods, such as for small scale production, the solid controlled release tablet can be pressed for 15-60 seconds at 1000 psi, or can be pressed for 1 minute at 2000 psi. Commercial production of the solid controlled release composition can vary by time and pressure, for example. In an alternative example, the components are mixed and harden into a solid form. The solidification process can last from a few minutes to about six hours depending on factors such as but not limited to: the size of the formed or cast composition, the ingredients of the composition, and the temperature of the composition.

The solid controlled release compositions may be formed using a batch or continuous mixing system. In an exemplary embodiment, a single- or twin-screw extruder is used to combine and mix one or more ingredients at high shear to form a homogeneous mixture. In some embodiments, the process mixture may be dispensed from the mixture by forming, pressing, casting, extruding, or other suitable means, whereupon the composition is pressed or hardens to a solid form. The structure of the matrix may be characterized according to its hardness, melting point, material distribution, crystal structure, and other like properties according to known methods in the art. Generally, a solid controlled release composition processed according to the methods is substantially homogeneous with regard to the distribution of ingredients throughout its mass and is dimensionally stable. As referred to herein, dimensional stability refers to a change in dimension of the solid composition (such as from cracking and/or swelling) greater than 3% as measured in length, height and/or width (depending upon the method of solidification, shape of the solid detergent composition and/or formulation into any type of capsule or other component for dispensing) at the evaluated temperature and time conditions outlined herein and at ambient humidity of the evaluated atmosphere. The average growth numbers in length, height and/or width represent the change in dimension.

By the term "solid", it is meant that the hardened solid controlled release composition will not flow and will substantially retain its shape under moderate stress or pressure or mere gravity. The degree of hardness of the solid controlled release composition may range from that of a fused solid product which is relatively dense and hard, for example, like concrete, to a consistency characterized as being a hardened paste. In addition, the term "solid" refers to the state of the solid controlled release composition under the expected conditions of storage and use of the solid composition. In general, it is expected that the solid controlled release composition will remain in solid form when exposed to temperatures of up to approximately 100 degrees F. and particularly up to approximately 120 degree F. and retains a dimensional stability.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Various solid hydroxide-based detergent compositions were evaluated for ability of a polysaccharide material to control release of the hydroxide-based detergent according to embodiments. In this example xanthan gum was evaluated in an STPP-containing formulation for an ability to decrease solubility of a hydroxide-based detergent block located in the wash chamber of a dishmachine. Formulations in Table 2 were evaluated, which included active ingredients including STPP, a polyoxypropylene polyoxyethylene surfactant and a polycarboxylic acid polymer.

TABLE 2

| Raw Material | Control | Tablet 1 | Tablet 2 |
|---|---|---|---|
| STPP | 36.4 | 36.4 | 36.4 |
| NaOH | 54.23 | 51.73 | 49.23 |
| Xanthan Gum | 0 | 2.5 | 5 |
| Water | 0.62 | 0.62 | 0.62 |
| Active Ingredients | 8.75 | 8.75 | 8.75 |
| Total | 100 | 100 | 100 |

The formulations in Table 2 were used to make 50 gram pressed tablets. For each tablet, 50 g of the mixture was added to a pre-fabricated mold. The powder was compressed in the mold at 1000 PSI for 20 seconds. The tablets were removed from the mold and stored at room temperature until testing at least 24 hours later.

Figure 2:
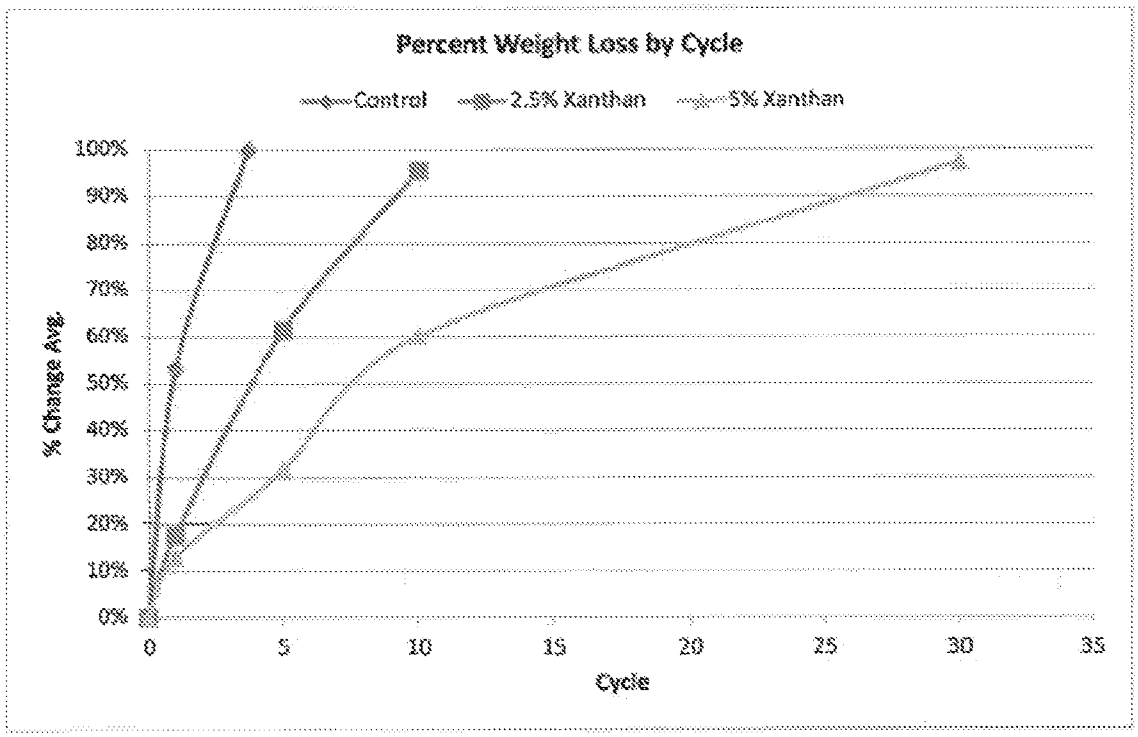
FIG. 2 depicts the percent weight loss versus number of ware wash cycle of the solid controlled release composition as a function of the concentration of the xanthan gum evaluated as the polysaccharide material in the tablet according to embodiments of the compositions.
Figure 3:
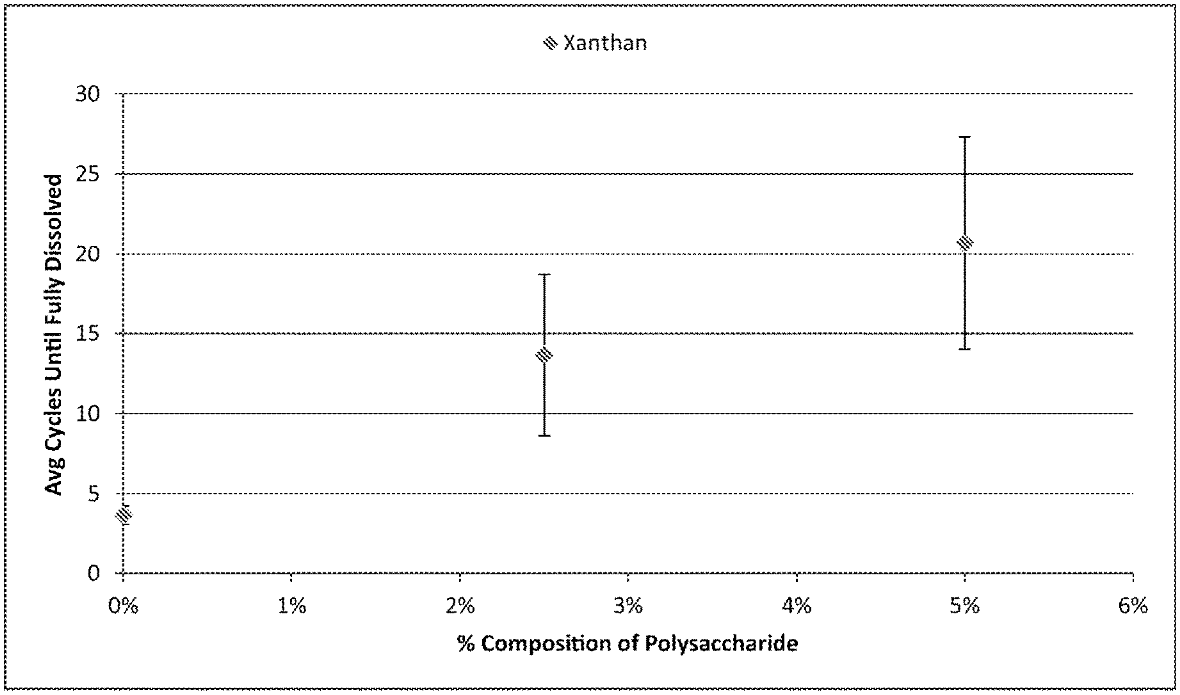
FIG. 3 depicts the average number of total ware wash cycles that the solid controlled release composition was utilized before being dissolved as a function of the concentration of the xanthan gum evaluated as the polysaccharide material in the tablet according to embodiments of the compositions.

Pressed tablets of commercial ware wash detergents with portions of the hydroxide alkalinity substituted for the polysaccharide material Xanthan Gum at increasing concentrations of 2.5% and 5% were evaluated. The tablets were tested to see how many cycles in a dishmachine it took before the tablet was visibly dissolved. The tablet was held in a small screened enclosure above the sump on the side of the machine wash compartment, as shown in FIG. 1. The tablets were placed in the enclosure at cycle 0 and washed consecutively with 30 second intervals between each wash cycle. The cycle count for each tablet was considered the number of cycles completed prior to the tablet being visibly completely dissolved and no longer present in the enclosure. The testing conditions were as follows:

Machine: Hobart AM-15
Wash Temp: 155-160° F.
Rinse Temp: 180-190° F.
Wash Length: 45 seconds
Rinse Length: 10 seconds The results of employing Xanthan Gum as the polysaccharide material for the controlled release agent are shown in FIG. 2 and FIG. 3. The results in FIG. 2 indicate the increase in lifespan of the solid detergent tablet with increasing xanthan gum, as measured by the percent of weight loss per cycle (FIG. 2). Controlled release of detergent from the tablet was slower at the higher concentration of 5% in comparison to 2.5% Xanthan Gum. FIG. 3 shows the total number of cycles of the tablet using the xanthan gum as the polysaccharide material for increasing xanthan gum concentration. At 5% xanthan gum the life span of the tablet was increased to at least 20 cycles.

Example 2

The compositions of Example 1 were further compared to compositions containing sodium carboxymethyl cellulose (CMC) as the evaluated polysaccharide material at varying concentrations as shown in Table 3.

TABLE 3

| Raw Material | Control | Tablet 1 | Tablet 2 | Tablet 3 |
|---|---|---|---|---|
| STPP | 36.4 | 36.4 | 36.4 | 36.4 |
| NaOH | 52.22 | 47.22 | 42.22 | 32.22 |
| Carboxymethyl Cellulose (CMC) | 0 | 5 | 10 | 20 |
| Active Ingredients | 8.75 | 8.75 | 8.75 | 8.75 |
| Water | 2.64 | 2.64 | 2.64 | 2.64 |
| Total | 100 | 100 | 100 | 100 |

Figure 4:
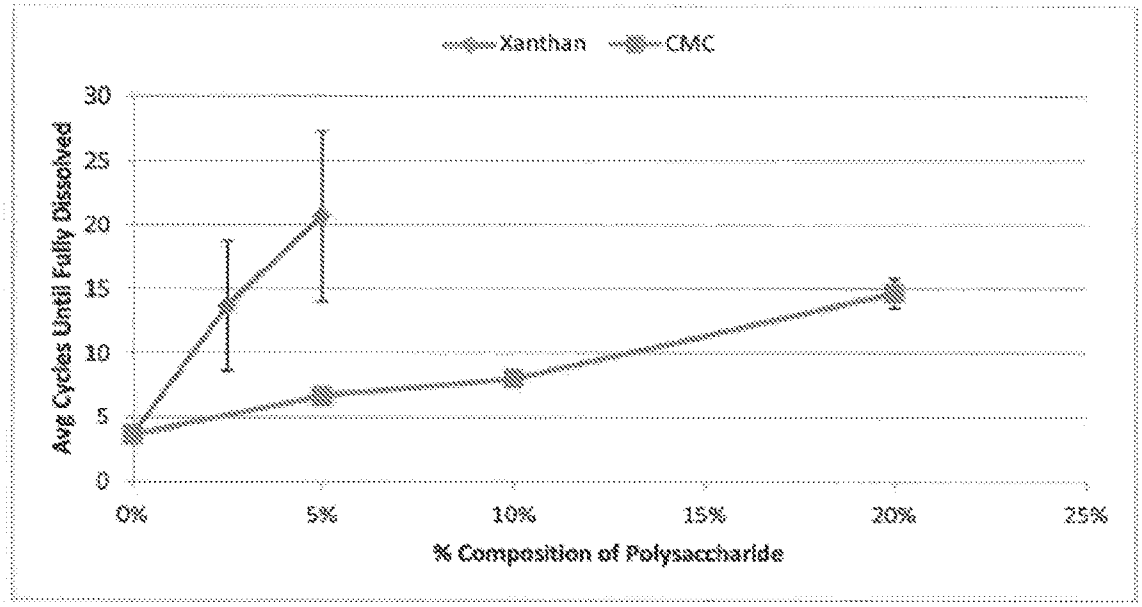
FIG. 4 depicts the average number of total ware wash cycles that the solid controlled release composition was utilized before being dissolved as a function of the concentration of the xanthan gum or carboxymethyl cellulose (CMC) as the polysaccharide material in the tablets according to embodiments of the compositions.
Figure 5:
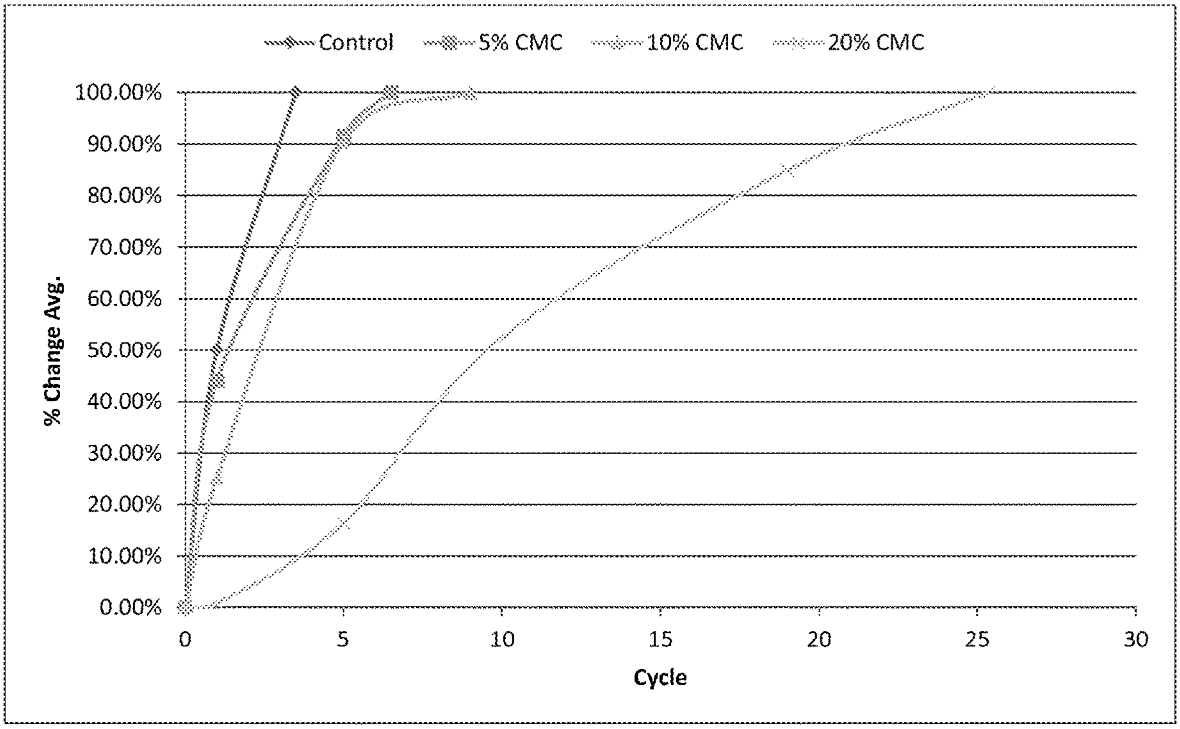
FIG. 5 depicts the percent weight loss versus number of ware wash cyles of the solid controlled release composition as a function of the concentration of the carboxymethyl cellulose (CMC) evaluated as the polysaccharide materials in the tablet.
Figure 6:
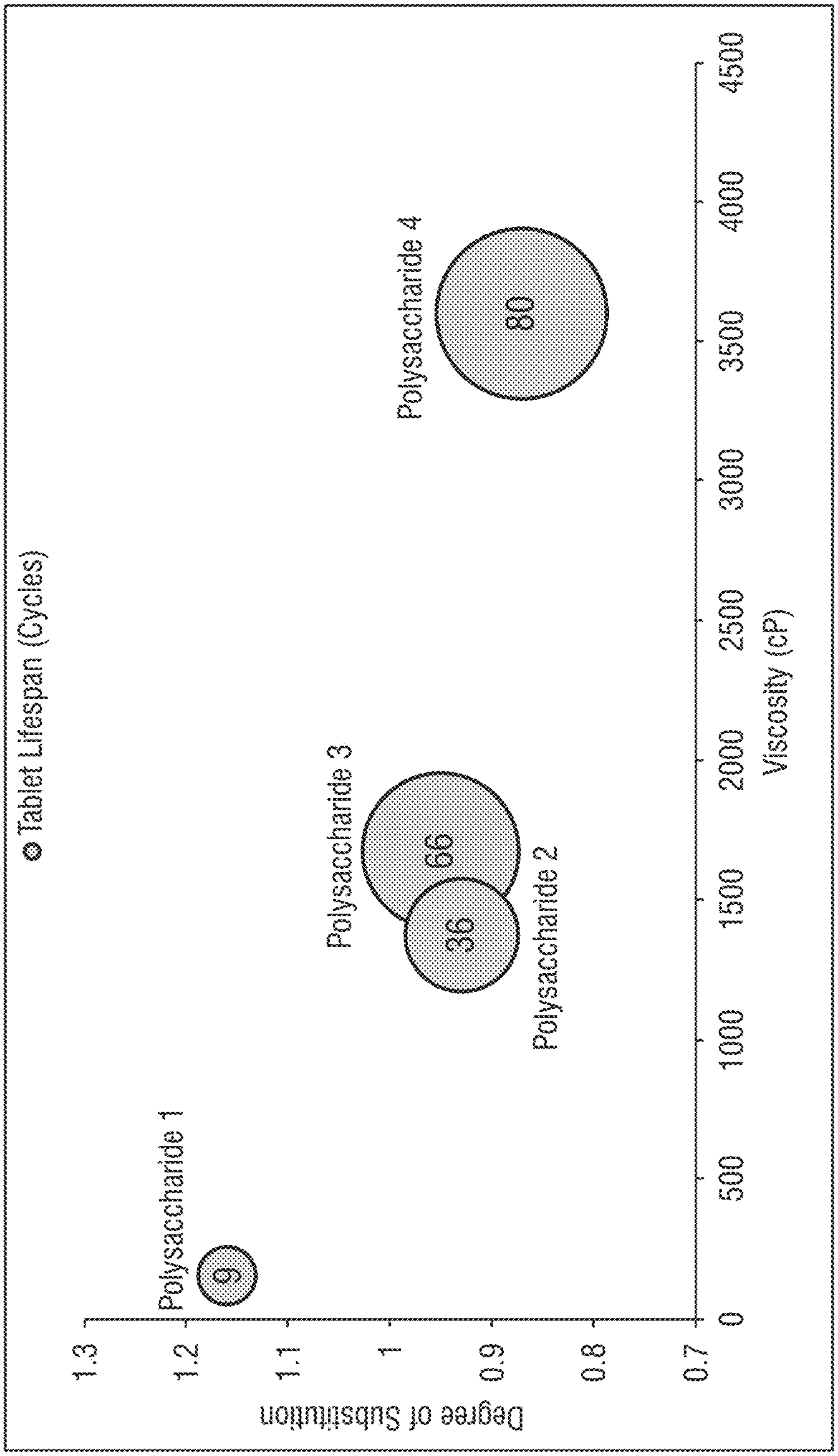
FIG. 6 depicts the average total number of ware wash cycles that solid controlled release compositions were utilized before being dissolved as a function of degree of substitution and viscosity of the carboxymethyl cellulose (CMC) polysaccharide material in the tablet according to embodiments of the compositions.

Both xanthan gum and CMC were found to beneficially extend the life of the tablet in terms of cycles. The results with the formulations from Table 3 containing CMC are shown in FIGS. 4, 5 and 6. FIG. 4 shows the data from earlier testing of xanthan at 0, 2.5 and 5% compared to the formulations of Table 3 containing CMC. FIG. 5 shows the average percentage change of the tablet (as it is dissolved) with the formulations of Table 3 containing CMC.

The solubility rate for the tablets after consecutive wash cycles was also studied with the addition of CMC and xanthan gum polysaccharide materials. In each of the experiments, three tablets were tested for each data point and the percent weight loss was recorded after the tablets were completely dried in an oven at 150° C. for one hour. The results indicate that the addition of CMC and xanthan gum to the solid formulation contribute to a longer lifespan by reducing the amount of solid released during each wash cycle. Without being limited to a particular mechanism and/or formulation of the compositions, the approximate rate of dissolution for each tablet with polysaccharide materials decreases relative to the tablets with lower polysaccharide materials content. Thus, the concentration of detergent released in the dishmachine sump can be manipulated by the content of polysaccharide used in the tablet formulation. Beneficially, these results confirm that the compositions disclosed herein can be used as a dispenser-less option for a dishmachine.

Example 3

Additional studies were performed with NaCMC samples with varying molecular weight and degrees of substitution. Degrees of substitution (D.S.) for NaCMC indicate the frequency of carboxymethyl groups attached to each individual glucose unit of a cellulose molecule. If the D.S. is 1.0 then 1 of the hydroxyl groups on each glucose unit is substituted for a carboxymethyl group. Three tablets for each condition were made using the following raw materials: CMC (250,000 MW, D.S. 0.7; 250,000 MW, D.S. 1.2; and 90,000 MW, D.S. 0.9) available from Sigma Aldrich. The dissolution of these tablets was observed in the dishmachine until completely dissolved.

A control with no D.S. (no NaCMC included in the formulation) was compared to compositions containing CMC with 0.7, 0.9 and 1.2 D.S., respectively. There was significant impact of the D.S. of NaCMC on the dissolution rate of each tablet. At 10 wt % incorporation in the tablet composition, NaCMC with a D.S. of 0.7 lasted for approximately 4 cycles, compared to approximately 16 cycles when the D.S. of NaCMC was 0.9, and 25 cycles on average for NaCMC with a D.S. of 1.2. Additionally, a higher D.S of NaCMC impacted the conductivity added to the sump caused a more even dispense rate over time compared. A more consistent dispense rate is ideal for dispensing applications, especially in a dishmachine application, in order to provide consistent and repetitive results.

Example 4

Additional solid caustic-based detergent compositions were evaluated according to embodiments of the compositions and dissolution rates thereof with varying D.S. and viscosity. The formulation in Table 4 was utilized to evaluate several NaCMC polysaccharide materials with varying DS from 0.9 to 1.2 and viscosity from about 150 cP to about 1700 cP, as shown in Table 5. The additional active ingredients include surfactants and polymer materials (consistent in all evaluated formulations).

TABLE 4

| Description | 0% Polysaccharide | 5% Polysaccharide | 10% Polysaccharide |
|---|---|---|---|
| STPP | 36.4 | 36.4 | 36.4 |
| NaOH | 52.22 | 47.22 | 42.22 |
| Carboxymethyl Cellulose (CMC) | 0 | 5.0 | 10.0 |
| Active Ingredients | 8.75 | 8.75 | 8.75 |
| Water | 2.64 | 2.64 | 2.64 |
| Total | 100 | 100 | 100 |

TABLE 5

| | D.S | Viscosity (mPa) | Viscosity (1%) |
|---|---|---|---|
| 1 | 1.16 | 300 | 150 |
| 2 | 0.9 | 758 | 379 |
| 3 | 1.18 | 1960 | 980 |
| 4 | 0.95 | 1680 | 1680 |

The results are shown in FIG. 6 wherein the size and labels for each circle correlate to the average number of cycles derived from a 50 g tablet when the CMC is included at the evalulated concentrations of the formula composition. The data shows that by choosing a particular degree of substitution and viscosity of the CMC material for the detergent composition the lifespan of the tablet (or tablet longevity and ability to dose for a number of cycles) can be tailored according to the need for a specific application.

Example 5

Additional polysaccharides and cellulose derivatives were evaluated, including branched polysaccharides. The evaluated materials included: caustic control (no polysaccharide), CMC (Sample A; Sample B each as shown in Table 6), hydroxyethyl cellulose (HEC Natrosol Sample A; Cellosize Sample B each as shown in Table 6) and xanthan gum.

TABLE 6

| Sample | Viscosity (cPs) | DS |
|---|---|---|
| CMC A | 520 | 0.81 |
| CMC B | 1680 | 0.95 |
| HEC A | ~2000 | 1.5 |
| HEC B | ~3000 | 1.5 |

Figure 7:
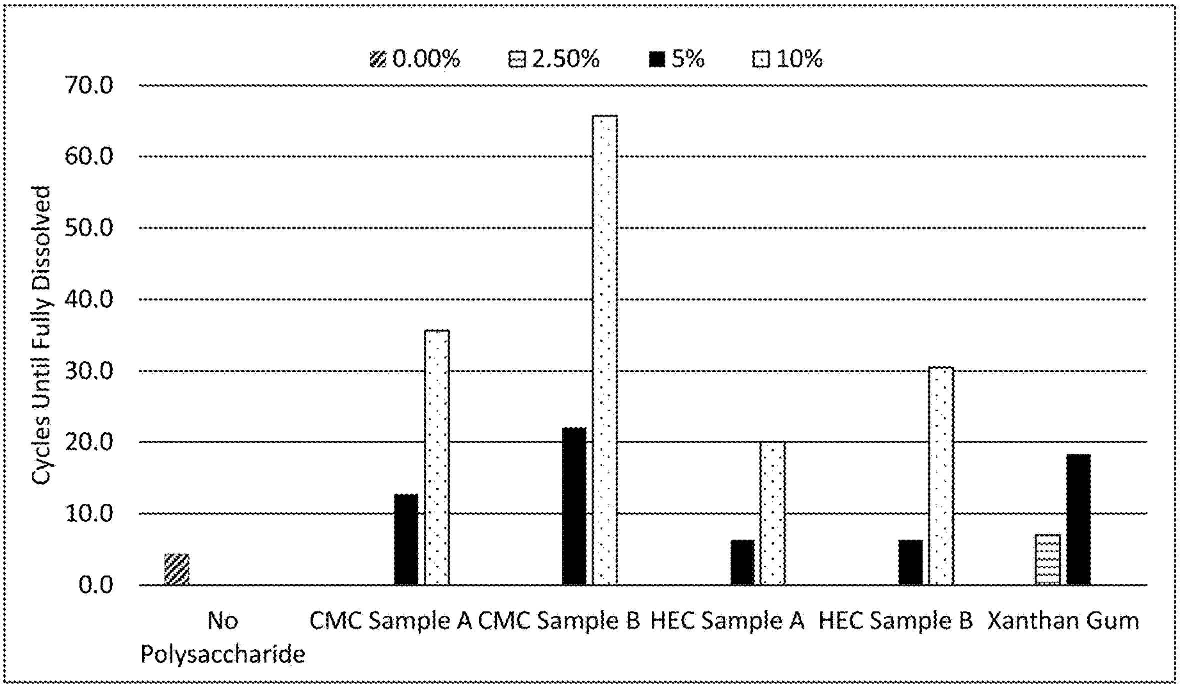
FIG. 7 shows the total number of ware wash cycles of controlled release tablets containing various polysaccharide materials according to embodiments of the compositions.

In FIG. 7 the average number of cycles until fully dissolved are shown for compositions with between 2.5 and 10 wt % of polysaccharides and cellulose derivatives and for a similar caustic composition without polysaccharide. As shown, the CMC and HEC samples, particularly at 10% of the polysachharide material exhibited a significantly increased tablet longevity, that may be beneficial in providing controlled release of a solid detergent composition.

Example 6

As set forth in the Examples 1-5 the maximum detergent concentration of the homogenous controlled release tablets is limited by the detergent dissolution rate. Additional tablets were evaluated where the tablet consisted of two phases, the first phase a controlled release portion composed of the detergent composition with the polysaccharide material(s) (e.g. CMC and/or xanthan) and a second phase composed of the detergent composition without the slow release polysaccharide material(s). These two compositions are mixed separately and not combined until the tablet is formed and are added separately in order to create 2 distinct sections.

Beneficially, a two-phase controlled release composition allows the controlled release product to be packaged in a single solid form. It is beneficial according to the formulations that users do not need to touch or contact the compositions from a safety and/or dispensing stand point, namely repeated emptying and refilling are not necessitated for the dishmachine during normal daily operation. Moreover, the 2-phase tablet gives the advantage of a long lasting detergent tablet with an increased amount of detergent released during the first few cycle due to rapid dissolution of the tablet phase not containing polysaccharide(s), resulting in an optimized starting detergent concentration in the dish machine at the start of dish washing operations. The detergent concentration is maintained over time by the controlled release of detergent from the controlled release portion of the tablet.

The evaluated formulations are shown in Table 7.

TABLE 7

| Description | Rapid Dissolution Phase | Controlled Release Phase |
|---|---|---|
| STPP | 36.4 | 36.4 |
| NaOH | 52.22 | 42.22 |
| Carboxymethyl Cellulose (CMC) | 0 | 10 |
| Active Ingredients | 8.75 | 8.75 |
| Water | 2.64 | 2.64 |
| Total | 100 | 100 |

Figure 8:
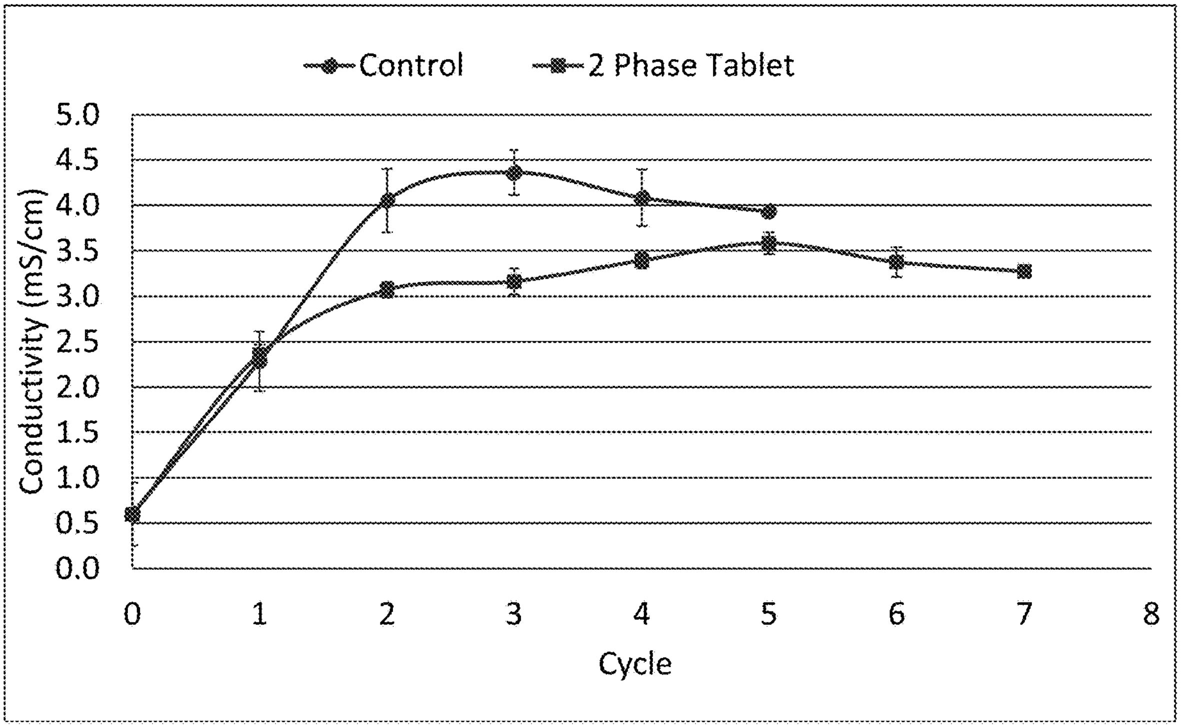
FIG. 8 shows an average tablet dispensing profile of a homogeneous single-phase tablet and a two-phase tablet measured as conductivity of the use solution versus ware number of ware wash cycle.

In FIG. 8 the average conductivity of the use solution in a ware wash machine is shown as a versus the number of ware wash cycles for a single phase controlled release tablet and a 2-phase controlled release tablet. Since conductivity correlates linearly with the amount of detergent released in the use solution, the graphs demonstrate that the concentration, and thus the active detergent concentration in the use solution, increases more rapidly and reached a higher maximum concentration than the single phase controlled release tablet. In FIG. 9 are images of the dissolution of a two-phase tablet over various cycles, with both sides of the 2-phase tablet photographed (top: controlled release; bottom: rapid dissolution phase). Both sides of the two-phase tablet are photographed showing that one side (without the polysachharide material—"rapid dissolution phase") is completely disintegrated and the controlled release portion remains intake after 4 cycles.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A system for cleaning wares in an automatic dishwashing environment comprising:

a solid controlled release composition comprising from about 20 wt-% to about 95 wt-% of a hydroxide alkalinity source, from about 5 wt-% to about 20 wt-% of at least one polysaccharide material comprising carboxymethylcellulose (CMC) and xanthan, wherein the at least one polysaccharide material has having between about a 1 wt-% to about 2 wt-% aqueous solution viscosity at 25° C. of between about 520 cps and about 5000 cps, and a surfactant;

wherein the solid composition is a homogenous 2-in-1 composition providing a detergent and rinse aid in a single solid composition, wherein the solid composition is a multi-use composition lasting at least 12 cycles, and wherein the solid composition is not encapsulated with a delayed release composition; and wherein the system does not include a dispensing system.

2. The system of claim 1, wherein the solid controlled release composition is a pressed solid.

3. The system of claim 1, wherein the solid controlled release composition is a capsule, tablet, coated tablet, puck, brick or block.

4. The system of claim 1, wherein the solid controlled release composition is a pressed solid tablet or block.

5. The system of claim 1, wherein the automatic dishwashing environment is a consumer or commercial dish washing machine.

6. The system of claim 1, wherein the system further comprises a holder to hold the solid controlled release composition and wherein the holder is configured to be secured to a wash tub of a consumer or commercial dish washing machine.

7. The system of claim 6, wherein the solid controlled release composition is placed in the wash tub before the beginning of a wash cycle and is present in the wash tub for more than one wash cycle.

8. The system of claim 1, wherein the polysaccharide material(s) has a degree of substitution (D.S.) between about zero and about 3, and/or wherein the polysaccharide material has a degree of polymerization between about 200 and about 15,000.

9. The system of claim 1, wherein the polysaccharide material(s) further comprises one or more of xanthan, hydroxyethylcellulose (HEC), hydroxypropylcellulose (HPC), hydroxypropyl methylcellulose (HPMC), methylcellulose (MC), cellulose acetate, cellulose triacetate, and combinations thereof.

10. The system of claim 1, wherein the solid controlled release composition comprises the hydroxide alkalinity source in an amount of between about 40 wt-% and about 95 wt-%, the polysaccharide material(s) in an amount of between about 5 wt-% and about 15 wt-%, and the surfactant in an amount of between about 0.1 wt-% and about 40 wt-%.

11. The system of claim 1, wherein the solid controlled release composition further comprises from about 0.1 wt-% to about 50 wt-% of an additional functional ingredient, wherein the additional functional ingredient is one or more of defoaming agents, anti-redeposition agents, anti-scale agents, bleaching agents, solubility modifiers, dispersants, metal protecting agents, stabilizing agents, corrosion inhibitors, sequestrants and/or chelating agents, threshold inhibitors, crystal modifiers, fragrances and/or dyes, hydrotropes or couplers, buffers, and solvents, and optionally wherein the solid controlled release composition is phosphate-free.

12. A system for cleaning wares in an automatic dishwashing environment comprising:

a solid controlled release composition comprising a first phase and a second phase, wherein the first phase is a homogenous solid comprising from about 20 wt-% to about 95 wt-% of a hydroxide alkalinity source, from about 5 wt-% to about 20 wt-% of at least one polysaccharide material comprising carboxymethylcellulose (CMC), wherein the at least one polysaccharide material has between about a 1 wt-% to about 2 wt-% aqueous solution viscosity at 25 ° C. of between about 520 cps and about 5000 cps, and a surfactant, and wherein the second phase is a homogenous solid comprising a hydroxide alkalinity source and an active ingredient cleaning agent;

wherein the solid controlled release composition is a multi-use composition lasting at least 12 cycles and not encapsulated with a delayed release composition; and wherein the system does not include a dispensing system.

13. The system of claim 12, wherein the first phase and the second phase are present in a weight ratio of first phase to second phase of from about 10:1 to about 1:10.

14. The system of claim 12, wherein the second phase does not contain any controlled release agents, and wherein the first phase and/or second phase further comprises an additional functional ingredient, wherein the additional functional ingredient is one or more of defoaming agents, anti-redeposition agents, anti-scale agents, bleaching agents, solubility modifiers, dispersants, metal protecting agents, stabilizing agents, corrosion inhibitors, sequestrants and/or chelating agents, threshold inhibitors, crystal modifiers, fragrances and/or dyes, hydrotropes or couplers, buffers, and solvents.

15. The system of claim 12, wherein the solid controlled release composition is a multi-phase solid comprising two or more solid phases.

16. The system of claim 12, wherein the polysaccharide material(s) of the first phase has a degree of substitution (D.S.) between about zero and about 3, and/or wherein the polysaccharide material has a degree of polymerization between about 200 and about 15,000.

17. The system of claim 12, wherein the polysaccharide material(s) of the first phase further comprises one or more of xanthan, hydroxyethylcellulose (HEC), hydroxypropylcellulose (HPC), hydroxypropyl methylcellulose (HPMC), methylcellulose (MC), cellulose acetate, cellulose triacetate, and combinations thereof.

18. The system of claim 12, wherein the automatic dishwashing environment is a consumer or commercial dish washing machine.

19. The system of claim 12, wherein the system further comprises a holder to hold the solid controlled release composition and wherein the holder is configured to be secured to a wash tub of a consumer or commercial dish washing machine, and wherein the solid controlled release composition is placed in the wash tub before the beginning of a wash cycle and is present in the wash tub for more than one wash cycle.

* * * * *